(12) United States Patent
Shimizu et al.

(10) Patent No.: US 10,253,191 B2
(45) Date of Patent: Apr. 9, 2019

(54) MAGNETIC PIGMENTS

(75) Inventors: Kaiman Shimizu, Roth (DE); Fumiko Sasaki, Iwaki (JP); Yukitaka Watanabe, Iwaki (JP); Masahiko Yazawa, Iwaki (JP)

(73) Assignee: MERCK PATENT GMBH, Darmstadt (DE)

(*) Notice: Subject to any disclaimer, the term of this patent is extended or adjusted under 35 U.S.C. 154(b) by 1547 days.

(21) Appl. No.: 13/992,116

(22) PCT Filed: Nov. 14, 2011

(86) PCT No.: PCT/EP2011/005731
§ 371 (c)(1),
(2), (4) Date: Jun. 6, 2013

(87) PCT Pub. No.: WO2012/084097
PCT Pub. Date: Jun. 28, 2012

(65) Prior Publication Data
US 2013/0257035 A1    Oct. 3, 2013

(30) Foreign Application Priority Data

Dec. 9, 2010    (EP) .................................... 10015472

(51) Int. Cl.
*C09D 5/23* (2006.01)
*B42D 15/00* (2006.01)
(Continued)

(52) U.S. Cl.
CPC .............. *C09D 5/23* (2013.01); *B42D 15/00* (2013.01); *C09C 1/0015* (2013.01);
(Continued)

(58) Field of Classification Search
CPC ...... C09D 5/23; C09D 11/037; C09D 11/322; B42D 15/00; C09C 1/0015;
(Continued)

(56) References Cited

U.S. PATENT DOCUMENTS 3,926,659 A    12/1975    Bernhard et al.
5,702,519 A    12/1997    Nitta et al.
(Continued)

FOREIGN PATENT DOCUMENTS

DE    100 65 761    7/2002
EP    0 763 573    3/1997
(Continued)

OTHER PUBLICATIONS

English Translation of Office Action in related Japanese Patent Application No. 2013-542393.
(Continued)

*Primary Examiner* — Justin V Lewis
(74) *Attorney, Agent, or Firm* — Millen White Zelano & Branigan (57) ABSTRACT

The present invention is related to magnetic pigments comprising a transparent flaky homogeneously composed substrate having two parallel major surfaces and a coating comprising a layered structure composed of a hematite and a magnetite layer, to a process for the production of said pigments as well as to their use.

7 Claims, 2 Drawing Sheets

(51) Int. Cl.
   *C09D 11/322* (2014.01)
   *C09C 1/00* (2006.01)
   *H01F 1/37* (2006.01)
   *C09D 11/037* (2014.01)

(52) U.S. Cl.
   CPC .......... *C09D 11/037* (2013.01); *C09D 11/322* (2013.01); *C01P 2006/42* (2013.01); *C09C 2200/102* (2013.01); *C09C 2200/1004* (2013.01); *C09C 2200/301* (2013.01); *C09C 2200/302* (2013.01); *C09C 2200/401* (2013.01); *C09C 2220/106* (2013.01); *H01F 1/37* (2013.01)

(58) Field of Classification Search
   CPC ........ C09C 2200/401; C09C 2200/302; C09C 2200/301; C09C 2200/102; C09C 2200/1004; C09C 2220/106; H01F 1/37; C01P 2006/42
   USPC .................... 283/72, 74, 75, 82, 83, 85, 901
   See application file for complete search history.

(56) References Cited

U.S. PATENT DOCUMENTS

| | | | |
|---|---|---|---|
| 6,302,952 | B1 | 10/2001 | Mobbs et al. |
| 7,303,622 | B2 | 12/2007 | Loch et al. |
| 2003/0005859 | A1 | 1/2003 | Andes |
| 2004/0038355 | A1 | 2/2004 | Vogt et al. |
| 2005/0223940 | A1* | 10/2005 | Seeger ................. C09C 1/0015 106/31.86 |
| 2006/0070552 | A1 | 4/2006 | Loch et al. |
| 2007/0032573 | A1 | 2/2007 | Yanagase et al. |
| 2009/0255442 | A1* | 10/2009 | Hollman ............... C09C 1/0015 106/416 |
| 2010/0021565 | A1 | 1/2010 | Handrosch |

FOREIGN PATENT DOCUMENTS

| | | |
|---|---|---|
| GB | 2 333 518 | 7/1999 |
| JP | S62115071 A | 5/1987 |
| JP | S62174002 A | 7/1987 |
| JP | 2005307155 A | 11/2005 |
| WO | 2005028566 A1 | 3/2005 |

OTHER PUBLICATIONS

English Abstract for JPS62174002, Publication Date: Jul. 30, 1987.
English Abstract for JP2005307155, Publication Date: Nov. 4, 2005.
English Abstract for JP62115071, Publication Date: May 26, 1987.
International Search Report for PCT/EP2011/005731, Date of the actual completion of the international search: Jan. 27, 2012, dated Feb. 3, 2012.
English Translation of Office Action in related Korean Patent Application No. 2013-7017454 dated Jan. 18, 2018.

* cited by examiner

MAGNETIC PIGMENTS

The present invention relates to magnetic pigments comprising a transparent flaky homogeneously composed substrate having two parallel major surfaces and a coating comprising a layered structure which consists of a hematite layer and a magnetite layer, to a process for the production of said pigments as well as to their use.

The magnetic pigments of the present invention are in particular useful for decorative and security applications, where the magnetic properties of the pigments, especially their ability to orient in a magnetic field, as well as their outstanding colouristic characteristics may be reasonably combined, but may also be used in other fields where either the magnetic properties or the colouristic properties of the pigments might be of interest.

Besides acicular magnetic pigments, which are preferably used in magnetic recording media, flaky magnetic pigments per se are known for a long time for diverse applications.

U.S. Pat. No. 3,926,659 discloses mica pigments which are optionally coated with $TiO_2$ or $ZrO_2$ or hydrates thereof, having a uniform iron containing layer thereon, which may be of alpha iron oxide (hematite, $Fe_2O_3$) or of magnetite ($Fe_3O_4$). The colouristic properties of these pigments are mostly due to the interference colour produced by the $TiO_2$ or $ZrO_2$ layer, which is slightly shifted by the application of an alpha iron oxide layer thereon. Their body colour is, depending on the layer thickness of the alpha iron oxide layer, a warm reddish brown hue. In case a magnetite layer is produced on top of the $TiO_2$ or $ZrO_2$ layer, the interference colour produced by the underlying layer is reinforced by a thin black magnetite layer or superimposed by a thick black magnetite layer. Pigments having a thick magnetite layer lose their luster, because the magnetite layer is said to be rough due to the crystalline configuration (small crystals) thereof.

Pigments of this type do neither exhibit attractive colouristic properties, comprising a good hiding power as well as vivid interference colours, nor sufficiently good magnetic properties in order to be usable in security applications, where outstanding effects in colour as well as in magnetism are indispensable for the creation of striking security features.

In DE 100 65 761 A1 flaky magnetic particles are described, which are multilayered and contain a core comprising $Al_2O_3$ or a mixed phase of $Al_2O_2$ and $SiO_2$, an intermediate layer of amorphous $SiO_2$ and a shell containing iron, the latter may, inter alia, contain magnetite or hematite. These particles are coated with inorganic or organic coupling agents being able to react with nucleic acids or proteins for isolation thereof in aqueous solutions. Since these pigments are made from aluminum powders by suspension in water and adding water soluble silicatic compounds, the cores thereof are not of homogeneous composition, but of mixed oxides of aluminum and silicon instead, optionally with remainings of aluminum metal. In addition, since the core material decomposes at least partly, the platy shape of the particles and a smooth surface thereof may not be maintained in the resulting pigment. Furthermore, the control of the production process is difficult, since the reaction of aluminum powder in water is highly exothermic per se and since the following reaction with iron compounds is dangerous as well (thermite process). The colouristic properties of these pigments are not described, neither is their magnetic force nor their use in decorative or security applications.

Optically variable magnetic pigments are described in EP 686 675 B1. These pigments are of lamellar nonferromagnetic metallic substrates being coated with a first ferromagnetic layer, a second layer of silica, alumina or their hydrates, a third layer of a metal or of a black metal oxide and optionally a fourth layer of a colourless or coloured metal oxide. These pigments might be mixed with silicatic platelets which are coated with an inner metal oxide layer and a ferromagnetic layer thereon, which may, inter alia, be of magnetite, and optionally a further metal oxide layer thereon. The colouristic and in particular the magnetic properties of said silicatic pigments are not described for the pure pigments, but for the mixture only.

The pigments or pigment mixtures described in the latter document may be used in security applications, leading to three-dimensional effects when oriented magnetically in different directions and exhibiting different colours depending on the observation angle (optically variable). They exhibit strong hiding properties due to the metallic layers incorporated therein.

WO 2009/126437 discloses pigments comprising a substrate and a layer thereon, wherein the layer has regions of $\gamma\text{-}Fe_2O_3$ and regions of $\alpha\text{-}Fe_2O_3$.

These pigments exhibit bronze, copper and maroon pearl colours due to the intrinsic absorption colour of the iron oxides. In an intermediate production phase, the pigments comprise a $Fe_3O_4$ component on the upper side of the iron oxide layer, which is converted into $\gamma\text{-}Fe_2O_3$ in a later production step. Nevertheless, the content of $Fe_3O_4$ in the intermediate product is much less than the content of $\alpha\text{-}Fe_2O_3$, and the resulting intermediate products do still exhibit a bronze colour hue. Pigments of this type are in particular useful for automotive applications.

Most of the security applications known, in particular for bank notes, identity cards etc., request vivid interference colours and striking optically variable properties if pigments are used, e.g. in printed security features, as well as magnetism in some applications. As mentioned above, pigments which fulfil all of these requests have heretofore merely been known as pigments of the metallic type, namely pigments which comprise at least one metal layer and/or a metallic substrate. These pigments may be produced by cost extensive and complicated evaporation processes only and the production thereof does often require explosion protected facilities.

There is still a need for similar effects which might be achieved by pigments not having metallic layers, which are not bound to the yellow, brown or maroon colour range which is achievable when yellow iron oxides are used, and which may be produced in versatile and relatively simple processes.

In particular a vivid silvery colour is always regarded of value in most cultures and is, besides a golden colour, highly desirable in goods of value, e.g. bank notes and the like. Also desirable are e.g. intense blue, green, turquoise, violet or magenta colour hues with or without optically variable behavior, and even lustreous black coloured pigments. The combination of such vivid colours with a strong magnetic effect and the advantages thereof such as clearly visible three dimensional effects using merely one single pigment would be highly appreciated in the art, in particular for security or for decorative purposes.

Thus, the aim of the present invention is to provide pigments exhibiting sufficiently strong magnetic properties in order to be easily oriented in magnetic fields leading to three dimensional effects, exhibiting a broad range of strong and lustreous interference colours and optionally also exhibiting an optically variable behavior, in combination with a good hiding power, which do not contain metallic layers and may be produced in a simple wet coating process without involving any reduction steps, to provide an economic process for the production of these pigments, as well as their use.

The object of the present invention is achieved by magnetic pigments comprising a transparent flaky homogeneously composed substrate having two parallel major surfaces and a coating comprising a layered structure consisting of a first layer composed of hematite and/or goethite and of a second layer composed of magnetite, in this sequence, at least on the two major surfaces of the substrate, wherein the thickness of the layer composed of magnetite is larger than the thickness of the layer composed of hematite and/or goethite.

In addition, the object of the present invention is achieved by a process for the production of such magnetic pigments, comprising the following steps:
(a) dispersing particles being composed of transparent flaky homogeneously composed substrates having two parallel major surfaces, optionally being coated with at least one dielectric coating, in water,
(b) adding a water soluble iron (III) compound at a pH of between 2 and 4 and keeping the pH value constant, thereby precipitating a layer composed of hematite and/or goethite at least onto the two major surfaces of the substrates,
(c) raising the pH to a value of from 5.5 to 7.5 and adding a water soluble iron (II) compound and a water soluble iron (III) compound, and optionally also adding an aqueous solution of an aluminum compound, while keeping the pH value constant, thereby directly precipitating a magnetite layer, which is optionally doped with an aluminum compound, onto the surface of the substrate particles precoated in step (b),
(d) optionally washing and filtering the resulting product, and
(e) drying at a temperature in the range of from >100° C. to <180° C.

Furthermore, the object of the present invention is also achieved by the use of said pigments for pigmenting inks, paints, varnishes, coating compositions, plastics, foils, paper, ceramics, glasses, cosmetic and pharmaceutical formulations, for laser marking and for pigmenting pigment preparations of diverse solvent contents.

The first object of the invention is achieved by providing magnetic pigments comprising a transparent flaky substrate which is of homogeneous composition and has two major surfaces lying parallel to each other, having a coating comprising a layered structure consisting of a first layer being composed of hematite and/or goethite and a second layer being composed of magnetite, in this sequence, on the surfaces of the substrate.

A flaky substrate in the sense of the invention is a particulate substrate having an upper surface and a lower surface which do, both, constitute the major surfaces of the particulate substrate and lying parallel to each other.

Parallel in the sense of the invention does not merely mean strictly parallel in a geometrical sense, but also substantially parallel in a sense that the major surfaces are smooth and planar and in that the angle of deviation in comparison to geometrically parallel surfaces is not larger than 15°. The extension of the major surfaces in length and width constitutes the largest dimension (particle size) of the flaky particles. The length difference between the major surfaces constitutes the thickness of the flaky substrates. In general, the thickness of the flaky substrates of the present invention is much smaller than the particle size thereof. Usually, the ratio between particle size and thickness (aspect ratio) of the flaky substrates is at least 2 and preferably ≥20, i.e. up to 1000 or even larger, e.g. up to 2000. This applies at least to the ratio between mean particle size and mean thickness of the substrate particles as such, but preferably to the actual ratio between particle size and thickness of each single substrate particle.

Transparent in the sense of the present invention are flaky substrates if they substantially transmit visible light, i.e. to at least 90% of the incoming visible radiation.

The substrates of the magnetic pigments according to the present invention are homogeneous in their composition, i.e. they are composed of the same material, either of a single compound or a mixture of compounds or a mixed oxide, at each location in the substrate. In particular, there is no gradient or particular zones of different materials within a single substrate particle.

Flaky substrate particles of the type described above are usually not available by using common natural substrate particles such a mica, talc or other phyllosilicates. The latter materials are composed of several layers which are layered one on top of each other in such a way that the outer surfaces of the material are not planar and smooth, but exhibiting steps inside the layer package. Thus, planar and extremely smooth surfaces might not be achieved with these materials.

In contrast, synthetically produced substrate materials, such as substrates of $Al_2O_3$, of $SiO_2$, of glass or of different borosilicates, may be produced by exactly controlling the thickness of the particles as well as the smoothness of the outer surfaces, and, at best, also by controlling the thickness variation of the particles and deviation of the particle sizes in the end.

Therefore, substrates which are of a synthetically produced transparent material are preferred in the present invention.

The substrates of the pigments according to the present invention are preferably of $Al_2O_3$, of $Al_2O_3$ containing up to 5% by weight $TiO_2$, based on the weight of the substrate, of $SiO_2$, of $SiO_2$ containing up to 20% by weight silicon hydroxide, based on the weight of the substrate, of glass or of a borosilicate. In particular preferred are substrates of $Al_2O_3$ or of $Al_2O_3$ containing up to 5% by weight $TiO_2$, both referred to as aluminum dioxide flakes in the following. These are preferably present in the form of monocrystals. Flaky substrate particles of $SiO_2$ or of $SiO_2$ containing up to 20% of silicon hydroxide are referred to as silica flakes in the following.

The substrates employed for the pigments of the present invention have a mean thickness between 100 and 1000 nm, preferably between 100 and 500 nm and most preferred between 120 and 300 nm. The thickness deviation of the substrate particles is preferably not larger than 10% and may be controlled by the production process of the corresponding substrate particles.

The mean diameter of the substrate particles, which corresponds to the largest dimension of the substrate, i.e. the particle size, is usually between 5 and 200 µm, in particular between 5 and 150 µm, mostly preferred between 7 and 100 µm and at best between 7 and 50 µm. $D_{50}$ values of from 16 to 25 µm are preferred. A narrow particle size distribution is in particular of advantage. The particle size distribution may be controlled either by the milling process, by the classification processes, or by both of them, or, in the case of monocrystalline substrates, by the production process parameters.

The particle size (particle diameter) of the pigments may be measured by different methods, e.g. by a laser diffraction method using a commercially available instrument, for example a Malvern Mastersizer 2000, APA200, product of Malvern Instruments Ltd. UK. The advantage of this method is that, besides the actual particle size, also the particle size distribution within a pigment fraction or pigment mixture may be measured by the standard procedure (SOP). For determining the particle size as well as the thickness of a single pigment particle, SEM (scanning electron microscope) images may advantageously be used, where the thickness and the particle size of each particle may be directly measured.

Transparent substrates of the kind described above impart a higher chroma, a more vivid interference colour and, astonishingly, also a higher magnetism to the magnetic pigments according to the present invention, when compared with magnetic pigments exhibiting a magnetite coating on, for example, a mica substrate.

The coating comprising a layered structure which consists of a first layer being composed of hematite and/or goethite and a second layer being composed of magnetite, the latter on top of the former, may be a coating merely on the two major surfaces of the substrate, but does, preferably, encapsulate the transparent substrate in such a way that all of the outer surfaces of the transparent flaky substrate are coated with the hematite/goethite-magnetite-layered structure. It goes without saying that the hematite/goethite-magnetite-layered structure does not have to exhibit the same thickness at each single point of the substrate surface and that even there may be some smaller surface areas of the substrate which are not perfectly coated with the layered structure or, at least with the hematite/goethite layer mentioned above. Limitations of this kind are due to technical production aspects and do not harm the intention of the present invention.

For the purpose of the present invention, the layer composed of hematite and/or goethite is called "hematite layer" thereafter. The actual composition thereof is dependent on the precipitation conditions used for the preparation thereof. For the conditions given in the process according to the present invention, the composition of the hematite layer has been revealed being preferably either of pure hematite (alpha $Fe_2O_3$, ferric oxide) or of hematite containing goethite (alpha FeO(OH), hydrated ferric oxide). Usually, the content of goethite is smaller than the content of hematite.

The layer composed of magnetite is called "magnetite layer" thereafter and is, in the case it is produced by the process according to the present invention, composed of either pure magnetite ($Fe_3O_4$) or of magnetite containing very small amounts of maghemite (gamma $Fe_2O_3$).

For the optical characteristics of the pigments of the present invention it is very important that the thickness of the magnetite layer within the layered structure is larger than the thickness of the hematite layer. In fact, the thickness of the magnetite layer is much higher than the thickness of the hematite layer. Typically, the thickness of the magnetite layer within the layered structure is at least 10fold the thickness of the hematite layer.

The hematite layer is coated onto the (optionally pre-coated) substrate particles with a very small layer thickness only, starting from a molecular monolayer and having an upper limit of about 5 nm. Usually, the thickness of the hematite layer is in the range of from 0.1 to 3.5 nm, preferably of from 0.1 to 2.5 nm. According to the present invention, the hematite layer may act as a binder for the magnetite layer which is to be coated on top of the hematite layer underneath.

Furthermore, in particular with respect to the synthetically produced substrate particles which are preferred according to the present invention, or with respect to the possible precoatings they bear, the usually obtained outer surfaces of these particles are often not particularly useful for directly being coated with iron oxides at a rather lower acidic to neutral pH value as used for the direct coating of $Fe_3O_4$ according to the present invention. This holds in particular true for the $Al_2O_3$ flakes as mentioned above or for precoatings of $Al_2O_3$.

Therefore, the thin hematite layer, which may in addition also act as a means for activating the surface of the substrate particles, is coated directly onto the substrate or onto the pre-coated substrate, since it might be directly precipitated with good success onto almost all known substrates or precoatings and provides an activated surface itself, which is of advantage for the precipitation of the following magnetite layer. Furthermore, the planar surface of the substrate, in particular the very smooth and planar surfaces of synthetically produced substrates, may be maintained by precipitating a dense and uniform, but ultra thin hematite layer.

In addition, in case the underlying, optionally pre-coated, substrate contains $Al_2O_3$ crystals or is composed of these, the following hematite layer is able to form crystals in the same crystal structure as present in the underlying substrate or pre-coating, namely in the corundum crystal structure, which is of advantage for the formation of a dense hematite layer. In such a case, the growth of the hematite layer on the substrate which contains $Al_2O_3$ crystals or is substantially composed of these is similar to an epitaxial crystal growth process of a crystalline layer onto a solid substrate.

Still furthermore, the presence of the hematite layer is also advantageously useful for forming a dense, planar and substantially crystalline layer of $Fe_3O_4$ directly thereon by a precipitation procedure.

From the prior art it was known that $Fe_3O_4$ layers could be formed in a reduction process with a hematite layer as the starting material. Following this reduction process, unevenness of the resulting layer should be expected, since non-regular reduction throughout the layer thickness of the former hematite layer (gradient) might occur. Furthermore, when using prior art precipitation methods, small crystallites of $Fe_3O_4$ and a rather loose crystal structure of the layer, which result if $Fe_3O_4$ is precipitated using Fe(II) compounds in the presence of an oxidation means at rather high (8 to 11) pH values, lead to non-lustreous pigments in the end.

To the contrary, the pigments according to the present invention exhibit a strong luster as well as vivid interference colours, which depend, inter alia, on the smoothness and denseness of each interference layer of the pigment, including the magnetite layer.

The magnetite layer of the layered structure of the pigments according to the present invention exhibits a dense and crystalline structure as mentioned above and is present in a thickness of from at least 15 nm to about 250 nm, in particular of from 20 nm to 180 nm and advantageously of from 25 nm to 150 nm.

Since the magnetite layer is smooth, dense and planar and exhibits a high refractive index of higher than 2.0 (about 2.4), it does not merely impart magnetic characteristics to the pigments according to the present invention, but does also act as an interference layer, thereby imparting an interference colour as well as, in addition, also a black body colour and an intense luster to the pigments obtained so far.

Usually, the interference colour provided by the magnetite layer depends on the actual thickness of the magnetite layer and may vary between reddish, bluish, greenish, dark violet or like hues.

In addition, it is preferred that the magnetite layer is doped with at least one aluminum compound, which is preferably an aluminum oxide and/or an aluminum oxide hydrate. The doping is accomplished by adding an appropriate aluminum compound while the magnetite layer is precipitated onto the substrate particles pre-coated with hematite. Useful aluminum compounds are e.g. aluminum sulphates, aluminum chlorides or aluminum nitrates.

The Al-doping of the magnetite layer contributes to the optical behavior of the magnetite layer and facilitates the precipitation of the following layers onto the magnetite layer, if present.

The aluminum oxide and/or aluminum oxide hydrate, as mentioned above, is present in the magnetite coating with a content of preferably between 0.1 and less than 5% by weight, based on the weight of the magnetite coating. They do not form mixed oxides with the iron component since their content is far too small. Instead, they are present as the aluminum oxide and/or oxide hydrate per se, e.g. as $Al_2O_3$ or AlOOH, in the magnetite coating.

Besides the fact that the following dielectric layers may be coated onto the magnetite layer much easier in the case that the magnetite layer is doped with an Al-component, the improved optical characteristics include a better gloss and a clearer and more intense interference colour.

Thus, the embodiment of the present invention where the magnetite layer is doped with an aluminum compound as disclosed above is preferred.

Most preferred is the embodiment of the present invention where the substrate material of the magnetic pigment is an aluminum dioxide flake as defined above, having no pre-coating but only a layered structure directly onto the substrate and encapsulating the substrate, whereby the layered structure is composed of a first hematite layer and a second magnetite layer doped with an Al-component as defined above, followed by at least one dielectric layer on top of the magnetite layer.

Also for the other substrate flakes mentioned above which are different from aluminum dioxide flakes, this embodiment is preferred.

Nevertheless, in order to adapt the colouristic properties of the magnetic pigments of the present invention and/or in order to improve the surface characteristics of the substrate particles and/or in order to improve the application properties of the pigments in different media, there may be further coatings or layers, respectively, employed.

To this end, the transparent substrate flake may be pre-coated with at least one dielectric coating prior to coating the substrate particle with the layered structure consisting of the hematite layer and the magnetite layer.

Such a pre-coating may, inter alia, be applied in order to improve the surface characteristics of the substrate particles, in order to adapt the thickness of the substrate particles to a desired degree or in order to facilitate the coating process for coating the layered structure according to the present invention mentioned above. The adaption of the interference colours of the magnetic pigments of the present invention is, on the other hand, not the main intention of such a pre-coating, since the magnetite layer within the layered structure will provide the then obtained pigment with a black body colour and will absorb most of the incoming light, i.e. at least 70% thereof. Therefore, an underlying pre-coating would not interact to such an extent with incoming light that the contribution of such a pre-coating to an interference colour generated solely by this pre-coating should be reasonably expected. Therefore, the thickness of the pre-coating, if present, will be moderate, preferably in a range of from 0.1 to 50 nm, depending on the materials used for the pre-coating.

As materials for the pre-coating, dielectric materials are used, in particular dielectric materials which are commonly used in the production of interference pigments. Those materials may be of high (≥1.8) or low (<1.8) refractive index and may include oxides and/or oxide hydrates of titanium, iron, chromium, zinc, zirconium, tin, aluminum or silicon, alone or in mixtures thereof.

It goes without saying that the materials used are always different from the substrate material, what is to be noteworthy if $SiO_2$ flakes or $Al_2O_3$ flakes are used as substrates.

In the case that such a dielectric pre-coating is applied to the substrate, said dielectric pre-coating is located between the substrate and the first layer (hematite layer) of the layered structure described above.

Of course, the pre-coating may be multilayered as such, but a complicated layer structure like this is costly and not effective in the economical sense.

Preferably, no pre-coating prior to the application of the layered structure consisting of the hematite layer and the magnetite layer is present. Therefore, preferred are magnetic pigments of the present invention, wherein the layered structure consisting of the hematite layer and the magnetite layer as defined above is directly located on the substrate, and in particular, is wholly encapsulating the substrate.

In contrast to pre-coatings, one or more dielectric layers on top of the hematite/magnetite layered structure are preferably present in the pigments according to the present invention. In this case, the one or more dielectric layers are located directly on top of the magnetite layer.

As material for these dielectric layers, dielectric metal oxide or metal oxide hydrates are generally used in the present invention. Although they might also be coloured under certain circumstances, they are advantageously composed of colourless metal oxides or metal oxide hydrates or of their mixtures, e.g. of oxides or hydrates of Ti, Zr, Zn, Sn, Ce, Si and Al, such as titanium dioxide, zirconium oxide, zinc oxide, tin oxide, cerium oxide, silicon dioxide and aluminum dioxide or the hydrates thereof.

The thickness of these dielectric layers which are employed in addition to the layered structure of hematite/magnetite depends on the purpose they are used for.

In case the interference colour of the novel magnetic pigments has to be adapted, altered or intensified, the thickness of each of the dielectric layers is in most cases between 20 and 300 nm, since under these circumstances, they will act as an optically active layer per se, acting as interference layers as such. Thereby the rule applies that the higher the refractive index of the dielectric material used is, the lower the layer thickness of the respective dielectric layer may be in order to achieve an interference effect of this single layer.

In a first embodiment of the present invention, there is at least one dielectric layer on top of the magnetite layer. Preferably, this dielectric layer is composed of a colourless, low refractive index dielectric material. Most preferred in the first embodiment is a single dielectric layer of silicon oxide hydrate that is located directly on top of the magnetite layer.

Silicon oxide hydrate is a dielectric material with a dense amorphous structure and is, therefore, very useful in order to protect the underlying magnetite layer in a way that, in particular, the magnetism of the magnetite layer is maintained upon use of the magnetic pigments according to the present invention. To this end, the silicon oxide hydrate layer must possess a certain thickness, which is far thicker than the thickness of usual aftercoatings, the latter may, inter alia, be composed of silicon dioxide or its hydrate too. Thus, the thickness of the silicon oxide hydrate layer located on top of the magnetite layer in the pigments according to the present invention is in the range of from 20 to 300 nm, in particular of from 50 to 250 nm and most preferred of from 80 to 200 nm.

Therefore, the silicon oxide hydrate layer located on top of the magnetite layer of the present pigments is an interference layer rather than an aftercoating. Nevertheless, the thickness thereof may be regulated in such a way that either the interference colour which is produced by the underlying magnetite layer may be strengthened or diminished. The resulting pigments exhibit a strong magnetism, a black body colour, a weak interference colour as well as strong luster.

In a second embodiment of the present invention, the first dielectric layer is overcoated with at least one further dielectric layer, the latter being of high refractive index. As material for this further dielectric layer, colourless metal oxides or metal oxide hydrates or of their mixtures, e.g. of oxides or hydrates of Ti, Zr and Zn, such as titanium dioxide, zirconium oxide and zinc oxide or the hydrates thereof are preferred. In particular titanium dioxide and/or the hydrate thereof is most preferred. Said materials are especially useful for the high refractive index layer which is located directly onto the first dielectric layer as mentioned above. The thickness of this high refractive index layer is usually in the range of from 20 to 300 nm, preferably in the range of from 30 to 200 nm and most preferred of from 40 to 180 nm.

The thickness of the high refractive index layer substantially determines the interference colour of the resulting magnetic pigments. Of course, in case the high refractive index layer is present in the magnetic pigments according to the present invention, magnetic pigments having strong interference colours are in the focus. Therefore, also the thickness of the underlying dielectric layer of low refractive index, which is preferably of silicon oxide hydrate, must be adapted to the thickness of the high refractive index layer thereon. By exact meeting the requirements for intensification of the light interference of either dielectric layer, the respective interference colours as well as, occasionally, the angle dependence of the interference colours (colour flop), might be adjusted advantageously.

Pigments of this type exhibit a strong magnetism, vivid interference colours, high chroma, good luster, optionally angle dependent interference colours (colour flop) and a strong hiding power. Depending on the thickness of the dielectric layers located on top of the layered hematite/magnetite structure according to the present invention, the interference colours enclose vivid silver hues as well as intense colours such as blue, green, turquoise, violet or magenta, occasionally accompanied with angle dependence of the interference colours. The hiding power of these intensely coloured magnetic pigments is excellent.

In case that more than one dielectric layer of a high refractive index material is applied onto the first (low refractive) dielectric layer, the further high refractive index layer located directly on the first high refractive index dielectric layer may be of coloured high refractive index dielectric materials. These are e.g. oxides and/or hydroxides of iron, chromium or cobalt, or mixtures of oxides and/or hydroxides of titanium with at least one of these compounds.

By means of these coloured high refractive materials it is possible to alter the body colour of the magnetic pigments of the present invention or to adapt their colouristic properties to a certain extent to particular application requirements. To this end, the thickness of the second dielectric layer having a high refractive index may vary in a broader range, i.e. of from 1 to 300 nm, depending on the purpose of its use.

In particular preferred for the second embodiment of the present invention are magnetic pigments which possess, onto the layered hematite/magnetite structure, a first dielectric layer being composed of silicon oxide hydrate, which is located directly on the surface of the magnetite layer, as well as a second, high refractive, dielectric layer composed of titanium dioxide and/or titanium dioxide hydrate, which is the sole high refractive index interference layer and is located directly on the surface of the low refractive index layer. Most preferred are pigments of said type, which are based on aluminum dioxide flakes as defined before.

Furthermore, the magnetic pigments according to the present invention might be adapted to their application requirements by further application of a so called aftercoating. In this case, dielectric layers may be used as well. They are known to impart better dispersibility, light fastness, etc., to effect pigments of different kinds and are well known in the art. So called aftercoatings based on inorganic dielectric compounds possess a thickness which is generally smaller than 20 nm and in particular between 1 and 15 nm, preferably between 2 and 10 nm. Dielectric layers of this type as such will not impart any interference to the whole pigment system. Here, in particular very thin layers of silicon dioxide, aluminum oxide, cerium oxide and/or tin oxide, etc., are used, either as single components or in the form of mixtures or of several very thin layers, one on top of the other.

Of course, interference imparting layers as well as layers for the improvement of the application properties may be used together within one embodiment of the present invention. In particular, the magnetic pigments mentioned above which are preferred, namely the pigments comprising a silicon oxide hydrate layer on the magnetite layer and a titanium dioxide or titanium oxide hydrate layer on the silicon oxide hydrate layer may be additionally provided with further inorganic aftercoatings in order to impart better application properties in the respective application media to them.

In addition to or alternatively to inorganic dielectric layers for aftercoatings as described above, thin coatings of organic materials, e.g. of different organic silanes, organic titanates, organic zirconates, may also be applied to the surface of the magnetic pigments of the present invention in order to improve their application abilities in different application media. Such coatings are known in the art of effect pigments and their application is, therefore, within the ordinary skill of the person skilled in the art.

Examples for the so called "after treatment" of effect pigments, either of organic or of inorganic nature, which may be employed in the present invention as described above, may be found in the following documents: EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805; the content thereof shall be enclosed in the present invention by reference.

A further object of the present invention is a process for the production of the magnetic pigments mentioned above which is reliable, economic, easily controllable and does not involve a reduction step.

Thus, a process is provided comprising the following steps:
(a) dispersing particles being composed of transparent flaky homogeneously composed substrates having two parallel major surfaces, optionally being coated with at least one dielectric coating, in water,
(b) adding a water soluble iron (III) compound at a pH of between 2 and 4 and keeping the pH value constant, thereby precipitating a layer composed of hematite and/or goethite at least onto the two major surfaces of the substrates,
(c) raising the pH to a value of from 5.5 to 7.5 and adding a water soluble iron (II) compound and a water soluble iron (III) compound, and optionally also adding an aqueous solution of an aluminum compound, while keeping the pH value constant, thereby directly precipitating a magnetite layer, which is optionally doped with an aluminum compound, onto the surface of the substrate particles precoated in step (b),
(d) optionally washing and filtering the resulting product, and
(e) drying at a temperature in the range of from >100° C. to <180° C.

As transparent flaky substrates, preferably synthetically substrates are employed, which are composed of $Al_2O_3$, of $SiO_2$, of glass or of different borosilicates. In particular, aluminum dioxide flakes, silica flakes, glass flakes or flakes of different borosilicates are used, wherein aluminum dioxide flakes and silica flakes are defined as described above.

Aluminum dioxide flakes are in particular preferred.

As already described earlier, these flakes may be produces with a good control of shape, thickness, thickness deviation, smoothness of the surfaces, planar surfaces and particle size distribution. The better these conditions may be met, the better the quality and reliability of the resulting pigments with respect to colour and magnetism.

For example, the aluminum dioxide flakes mentioned above may be produced by a process described in EP 763 573 A2, which is preferred. These substrate flakes contain a small amount of titanium dioxide, making the following coating procedure with the dielectric coating or with the hematite/magnetite layered structure easier. Furthermore, by variation of the amount of titanium dioxide within the limits given in the a. m. patent application, as well as by variation of the temperature for the final heat-treatment of the desired flaky aluminium oxide, the particle size and the thickness of the particles may be controlled, which data form the basis for the aspect ratio of the particles. As a rule of thumb, higher amounts of titanium oxide and higher temperatures for the final heat treatment lead to bigger particles having higher aspect ratios. But also aluminum dioxide flakes such as $\alpha$-$Al_2O_3$ in the form of hexagonal flakes having a particle diameter greater than 10 μm and an aspect ratio (particle diameter/thickness) of 5-10, which are known from JP-A 111239/1982, or aluminum oxide in the form of fine platy particles of a hexagonal crystal system, wherein the plane perpendicular to the c axis is grown into a plate, described in JP-A 39362/1992, would be useful as transparent substrate particles for the magnetic pigments of the present invention.

Silica flakes which may be used as transparent substrates for the production of the magnetic pigments of the present invention are for example described in WO 93/08237. Here, in particular silica flakes made of a silicatic precursor material without the addition of any soluble or insoluble colouring agents are preferred. They are preferably produced by coating the precursor material (such as sodium silicate or potassium silicate) on an endless belt, solidifying the film obtained after drying, treating the resulting solid film with acid, washing and finally separating the film from the belt, whereby the desired silica flakes are produced. Substrates of this type are available as pure silica flakes or, in case of having at least one dielectric coating thereon, under the trade name Colorstream® from Merck KGaA, Germany.

Transparent substrate flakes of glass and different borosilicates having the desired properties with respect to planar and smooth surfaces, relatively small thickness as described above, as well as small thickness and particle size deviation are also commercially available in the market.

The substrate particles as mentioned above may optionally be precoated with at least one dielectric coating as already described above. To this end, the procedures generally known in the art of pearlescent pigments and effect pigments may be employed. In particular, wet chemical coating procedures are preferred, and particularly preferred are wet chemical coating methods using inorganic starting materials, since these processes are easy to handle and to control, leading to encapsulated substrate particles per se.

In general, wet coating methods for coating the substrate particles with dielectric layers, in particular dielectric metal oxide or metal oxide hydrate layers, are performed as follows: The substrate particles are suspended in water, and one or more hydrolysable metal salts are added at a pH value which is appropriate for hydrolysis and is chosen in such a manner that the metal oxides or metal oxide hydrates are precipitated directly onto the platelets without any instances of secondary precipitation. The pH value is kept constant usually by simultaneous metered addition of a base and/or acid. Subsequently, the pigments are separated off, washed and dried and, if desired, calcined, it being possible to optimize the calcination temperature in respect to the particular coating present. In general, the calcination temperatures are between 250 and 1000° C., preferably between 350 and 900° C. If desired and in the case that the pre-coating should be composed of several layers, following the application of individual layers the pigments can be separated off, dried, and, if desired, calcined before being resuspended for the application of further layers by precipitation.

In the process for the production of the magnetic pigments according to the present invention, the calcination step does merely apply to the optionally present pre-coating on the substrate surface and is completely omitted for the layered hematite/magnetite structure as well as for all dielectric layers which are coated onto said hematite/magnetite layered structure. This is due to the fact that the magnetite layer would be destroyed by applying high temperatures as generally used in calcination steps.

For the sake of completeness, the coating of dielectric pre-coatings can also take place in a fluidized-bed reactor by means of gas-phase coating, in which it is possible, for example, to make appropriate use of the techniques proposed in EP 0 045 851 and EP 0 106 235 for preparing pearl luster pigments. But the wet coating methods as described above are clearly preferred.

Using the wet chemical methods described above, for instance, the coating of the transparent substrate particles with a silicon dioxide layer or a silicon oxide hydrate layer may be accomplished with a procedure as described in the following: A potassium or sodium silicate solution is metered into a suspension of the material that is to be coated and heated to about 50-100° C. The pH value is held constant at about 6-9 by simultaneous addition of a dilute mineral acid, such as HCl, $HNO_3$ or $H_2SO_4$. As soon as the desired layer thickness of $SiO_2$ has been reached, the addition of the silicate solution is terminated. The batch is subsequently stirred for about 0.5 h. Depending on whether silicon dioxide or silicon oxide hydrate should be achieved, the drying and/or calcination of the resulting layer is exhibited at moderate or higher temperatures, preferably of about 120° C. or higher.

For the application of a titanium dioxide layer, preference is given to the technique described in U.S. Pat. No. 3,553, 001. An aqueous titanium salt solution is added slowly to a suspension of the material that is to be coated, heated to about 50-100° C., and a substantially constant pH value of about 0.5-5 is maintained by simultaneous metered addition of a base, for example aqueous ammonia solution or aqueous alkali metal hydroxide solution. As soon as the desired thickness of the $TiO_2$ precipitate has been reached, the addition of both titanium salt solution and base is terminated.

This technique, also referred to as the titration process, is notable for the fact that it avoids an excess of titanium salt. This is achieved by supplying to the hydrolysis only that quantity per unit time which is necessary for uniform coating with the hydrated $TiO_2$ and which can be received per unit time by the available surface area of the particles to be coated. There is therefore no production of hydrated titanium dioxide particles not precipitated on the surface to be coated.

Processes for the wet chemical coating of flaky substrate particles for the production of pearlescent pigments are for example described in the following documents: DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602 and DE 32 35 017.

For coating the transparent substrate particles mentioned above, either precoated or not, with a hematite/magnetite layered structure according to the present invention, the following procedure is preferably applied:

The substrate particles are suspended in water. Preferably, the suspension is heated to a temperature of from 75° C. to 85° C. The pH value of the resulting suspension is adjusted to a value of between 2 and 4, and is kept constant. Thereafter, a water soluble iron (III) compound is slowly metered into the suspension while still keeping the pH value constant. After the addition of the soluble iron (III) compound is completed, whereby a thin layer composed of hematite and/or goethite is precipitated onto the surface of the substrate particles, the pH is raised to a value between 5.5 and 7.5 and kept constant, and a water soluble iron (II) compound as well as a further water soluble iron (III) compound is added to the suspension, either one by one or as a mixture, the latter is preferred. In the case that an aluminum compound should be incorporated into the magnetite layer which is preferred, the pH is preferably adjusted to a value between 6.5 and 7.5 and kept constant. Then, an aqueous solution of an aluminum compound is slowly metered into the suspension either prior to, or after, or, preferably, simultaneously with the iron (II) and iron (III) compounds, while keeping the pH value constant. The suspension is preferably kept under stirring for another 0.5 hours while still keeping the pH value constant.

The first and the second water soluble iron (III) compounds may either be the same or different compounds. Preferably, the same water soluble compound is used for the first as well as for the second addition of an iron (III) compound. The amount for the addition of the first iron (III) compound is chosen in such a manner that merely a very thin hematite layer may be precipitated onto the surface of the substrate particles by using this iron (III) compound. The resulting layer thickness is in the range of from some molecular layers to about 5 nm, as described above. To the contrary, the amounts for the iron (II) compound as well as for the second iron (III) compound, which is added together with the iron (II) compound, are chosen in such a manner that the ratio between iron (II) ions and iron (III) ions is between 9:1 and 9.7:0.3, so that magnetite may be precipitated directly onto the surface of the pre-coated substrate particles. Although there is a larger excess of the iron (II) compound present in advance, it has to be mentioned that the iron(II) compound is partly converted into iron (III) oxide due to the process conditions, resulting in direct precipitation of magnetite.

Additionally, the amounts of the iron (II) compound and iron (III) compound used for generating the magnetite layer are chosen in such a manner that the layer thickness of the resulting magnetite layer is larger than that of the hematite layer. Preferably, the amounts are chosen in such a manner that the resulting layer thickness of the magnetite layer is at least 10fold the layer thickness of the hematite layer. Since the density of the hematite layer is very similar to the density of the magnetite layer (5.24 $g/cm^3$ vs. 5.17 $g/cm^3$), the rule of thumb applies that about approximately $5 \times 10^{-3}$ g of hematite or magnetite is needed in order to coat a layer thickness of about 1 nm of either material onto 1 $m^2$ of the respective substrate.

In general, the following water soluble iron compounds may be used: $FeSO_4$, $FeCl_2$, $Fe(NH_2)_2(SO_4)_2$, $Fe(NO_3)_2$, $Fe_2(SO_4)_3$, $FeCl_3$, $FeNH_4(SO_4)_2$ or $Fe(NO_3)_3$; $FeSO_4$ and $Fe(NO_3)_3$ being particularly preferred.

In more detail, as water soluble iron (II) compound, preferably $FeSO_4*7 H_2O$ may be used. As water soluble iron (III) compound, $Fe(NO_3)_3*9 H_2O$ is preferably used.

As already mentioned earlier, it is of great advantage for the magnetic pigments of the present invention that an aluminum compound is included as a doping material in the magnetite layer. Such an Al-doping improves the facility to overcoat the magnetite layer with further dielectric layers as mentioned above and enhances, in addition, stability and denseness of the magnetite layer. Useful Al compounds are water soluble Al salts such as $AlCl_3$ and $Al_2(SO_4)_3$, in particular $Al_2(SO_4)_3 16 H_2O$ or poly aluminum chloride solution (PAC). This compound may be simply mixed with the iron (II) and iron (III) compounds mentioned above in an appropriate ratio, and then slowly applied to the suspension of the substrate particles already been pre-coated with at least the hematite layer. The conditions for the addition of the Al-compound are described above.

After the precipitation of the magnetite layer is completed, the resulting pigment is separated off, optionally washed, and dried. Drying takes place at a temperature in the range of from larger than 100° C. to lower than 180° C., in particular of from 110° C. to 140° C. The time period for the drying step is between 0.5 and 12 hours.

Optionally, the resulting pigments may be classified in order to limit the particle size distribution thereof.

Preferably, the process described above is executed in an inert gas atmosphere, for example using nitrogen, argon or the like.

It is crucial to the colouristic as well as the magnetic characteristics of the resulting pigment, that, after the hematite/magnetite layered structure has been coated onto the optionally pre-coated substrate particles, no calcination step at temperatures higher than 200° C. takes place.

The magnetic pigments according to the present invention, which are achieved by the process as described above, exhibit a lustreous black body colour, a slight interference colour which depends on the thickness of the magnetite layer and a strong magnetism which is sufficient to have the pigments oriented along the field lines in a magnetic field applied to a wet coating containing the pigments.

Nevertheless, intensely coloured magnetic pigments which exhibit interference colours and, in addition, optionally angle dependent interference colours (colour flop), are also highly desired in the field.

Therefore, in a further embodiment of the present invention, the magnetic pigments contain at least one further dielectric layer on top of the hematite/magnetite layered structure, i.e. on top of the magnetite layer, the dielectric layer(s) being able to impart interference colours to the resulting magnetic pigment.

To this end, at least one further dielectric layer is coated onto the magnetite layer once the hematite/magnetite layered structure has been applied onto the substrate particles. Coating of these additional dielectric layer(s) may, preferably, be accomplished prior to the drying step mentioned above, although an intermediate drying step is also possible. Optionally, a washing and/or filtering step may be executed after coating each dielectric layer onto the pre-coated substrate particles.

The material for the dielectric layers is preferably chosen from dielectric metal oxides and/or metal oxide hydrates. These may exhibit either a high refractive index (n≥1.8) or a low refractive index (n<1.8). Useful materials have been mentioned before.

Preferably, in case there is merely one single dielectric layer (being capable to produce interference colours by its own) applied onto the magnetite layer, the single dielectric layer is preferably composed of a colourless, low refractive index dielectric material. Most preferred is the application of a single dielectric layer of silicon oxide hydrate that is located directly on top of the magnetite layer.

Depending on the thickness of the low refractive index dielectric layer on top of the magnetite layer, the interference colour generated by the magnetite layer may be strengthened or diminished. In each case, the first dielectric layer on top of the magnetite layer is applied in such a thickness that the magnetic characteristics of the underlying magnetic pigments are maintained and protected. The resulting pigments exhibit a strong magnetism, a black body colour, a weak interference colour as well as strong luster.

In addition, the first dielectric layer on top of the magnetite layer, which is preferably of silicon oxide hydrate, serves as a smooth and useful base for a second dielectric layer, which is applied thereto in a second embodiment of the present invention. This second dielectric layer is composed of a high refractive index material. As material for this further (second) dielectric layer, colourless metal oxides or metal oxide hydrates or of their mixtures, e.g. of oxides or hydrates of Ti, Zr and Zn, such as titanium dioxide, zirconium oxide and zinc oxide or the hydrates thereof are preferred. In particular titanium dioxide and/or the hydrate thereof is most preferred. Said materials are especially useful for the high refractive index layer which is located directly on the first dielectric layer as mentioned above.

Details for the application of the first and second dielectric layer, in particular for the application of a first dielectric layer of silicon oxide hydrate and a second dielectric layer of titanium dioxide have been described earlier.

In the case that a first and a second dielectric layer, which are advantageously composed of silicon oxide hydrate and titanium dioxide, in this sequence, are applied onto the surface of the magnetic pigments being precoated with the hematite/magnetite layered structure, the resulting magnetic pigments do not merely exhibit a strong magnetism, a high hiding power as well as vivid interference colours, but may also exhibit angle depending interference colours (colour flop) in the case that the thickness of the first and second dielectric layer is adapted in a way to allow angle dependent interference. The skilled person is aware how this adaption may be accomplished.

Additional high refractive index dielectric layers imparting absorption colour and/or interference colour may be applied on top of the second dielectric layer, as already described before.

Next, further dielectric layers may be applied on top of either the first dielectric layer (in case it is the sole interference layer) or on top of the second dielectric layer (in case that a first and a second interference imparting layer have been applied onto the hematite/magnetite layered structure) or, optionally, on top of the third dielectric layer, which serve as protecting layers regarding the application media of the pigments and are so called aftercoating layers, not being capable to impart interference colours to the resulting pigments. These inorganic dielectric layers as well as organic protecting layers, which may also be applied thereon, have been described earlier to some extent.

The magnetic pigments of the present invention having the characteristics mentioned above, lend themselves to the use in sophisticated objects of value.

Therefore, one object of the present invention is solved by the use of the magnetic pigments according to the present invention for pigmenting inks, paints, varnishes, coating compositions, plastics, foils, paper, ceramics, glasses, cosmetic and pharmaceutic formulations, for laser marking and for pigmenting pigment preparations of diverse solvent contents.

Since the most common method of application of pigment containing media, in particular with respect to security applications, is in printing inks, it is preferred to use the present magnetic pigments in printing inks.

These may include, depending on the actual particle size of the magnetic pigments, all kinds of printing inks which are usually used in printing operations, including screen printing inks, gravure printing inks including intaglio printing inks, offset printing inks, flexographic printing inks as well as ink jet printing inks, to name only a few.

A further object of the present invention is also solved by a product containing the magnetic pigments of the present invention. In general, the pigments of the present invention may be applied to any product which can take advantage of one of the characteristics of the present pigments, i.e. their colouristic or their magnetic properties, or both.

In particular, the pigments of the present invention may be used with high advantage in decorative and security products, since their outstanding characteristics are very desirable in both areas.

Security products in the sense of the present invention are for example bank notes, cheques, passports, identification documents, smart cards, drivers licenses, share certificates, bonds, cheque cards, tax banderols, postage stamps, tickets, credit cards, debit cards, telephone cards, lottery tickets, gift vouchers, packing materials, decorative materials, brand products or any other product which has to be secured.

It goes without saying that the magnetic pigments according to the present invention may be used in admixture with organic as well as inorganic colourants and pigments and, in particular, with effect pigments of any kind. Organic pigments and colourants are, for example monoazo pigments, disazo pigments, polycyclic pigments, cationic, anionic or nonionic colourants. Inorganic colourants and pigments are, for example white pigments, coloured pigments, black pigments or effect pigments. Examples for appropriate effect pigments are metal effect pigments, pearlescent pigments or interference pigments, which are in general based on singly or multiply coated platelets of mica, glass, $Al_2O_3$, $Fe_2O_3$, $SiO_2$, etc. Examples for the structure and particular characteristics of these pigments are disclosed, inter alia, in RD 471001 or RD 472005, the disclosure thereof shall be included in the present specification by reference.

In addition, further colourants which may be used in admixture with the present magnetic pigments are luminescent colourants and/or pigments of any type as well as holographical pigments or LCPs (pigments on the basis of liquid crystal polymers). The magnetic pigments according to the present invention may be used in any desired mixing ratio with commonly used and commercially available pigments and fillers. Limitations for the use of the present pigments with other pigments and colourants are merely set in case that any mixture would disturb or limit the magnetic or colouristic properties of the pigments according to the present invention to a great extent.

The present invention is described in more detail in the following examples and figure, but should not be limited to these.

EXAMPLE 1

200 g of an aluminum dioxide flake ($Al_2O_3$ with minor content of $TiO_2$, mean thickness 220 nm, mean particle diameter 18 μm) is suspended in deionized water. The suspension is heated to 80° C. while stirring. Nitrogen gas is slowly added into the reaction vessel. The pH value is adjusted and kept constant to 3.0 by metering an acidic compound into the suspension (HCl, about 17.5 wt. %). While still keeping the pH value constant, a $Fe(NO_3)_3$ solution (100 ml, 10.12 g of $Fe(NO_3)_3 * 9\ H_2O$ in 100 ml deionized water) is added to the suspension. The pH value is then raised to about 7.0 by adding a basic composition (NaOH, about 30 wt. %) to the suspension. While keeping the pH value constant, an aqueous solution of an Al component and of a Fe(II) and Fe(III) component (800 ml, 288 g $FeSO_4 * 7\ H_2O$, 1.5 g $Al_2(SO_4)_3 * 16\ H_2O$ and 18 g $Fe(NO_3)_3 * 9\ H_2O$, in 1000 ml deionized water) is slowly metered into the suspension which is then kept for another 30 minutes while stirring. Thereafter, a water glass solution (about 190 g, 26% as $SiO_2$) is added while still keeping the pH constant. The suspension is kept for about 2 hours, then the resulting pigments are separated off by filtering and washed with deionized water.

Thereafter, the pigments are resuspended in another 2000 ml of deionized water, heated to a temperature of about 75° C., while adjusting a pH of about 2.0. A water soluble tin compound (124 ml, 6.95 g $SnCl_4$) is added to the pigment suspension while keeping the pH constant. Next, a water soluble titanium compound (800 ml, 100 g $TiCl_4$ in 1000 ml of deionized water) is added to the pigment suspension. The suspension is kept for another 10 minutes, then filtered and washed with deionized water. Eventually, the resulting pigments are dried at a temperature of about 120° C. and sieved.

The resulting pigment exhibits a brilliant silver powder colour with vivid luster and high magnetism as well as a high hiding power.

The powder colour is measured by using a Minolta CR-300 apparatus (product of Konica Minolta Holdings, Inc.). The resulting L value is 69.4, the a value is −1.9, the b value is −8.7 and chroma is 8.9.

A lacquer card is prepared as follows: 0.5 g of the pigment according to example 1 is mixed with 9.5 g of a standard NC-Acrylate lacquer (available from Merck KGaA per catalogue). The resulting mixture is coated by means of a bar coater onto usual black/white paper strips and dried. The resulting colouristic characteristics are measured by using the Minolta apparatus as mentioned above. The L value is determined to be 48.5, the a value is −2.3, the b value is −9.2 and chroma is determined to be 9.5.

The magnetic characteristics are measured by means of a vibrating sample magnetometer (Model VSM-5, made by Toei Industry Co., Ltd.) and the standardized procedure (in a 10 kOe magnetic field at room temperature). The saturation magnetization ($M_s$) is 14.21 emu/g, the residual magnetization ($M_r$) 9.0 emu/g and the coercive force 444 Oe.

Figure 1:
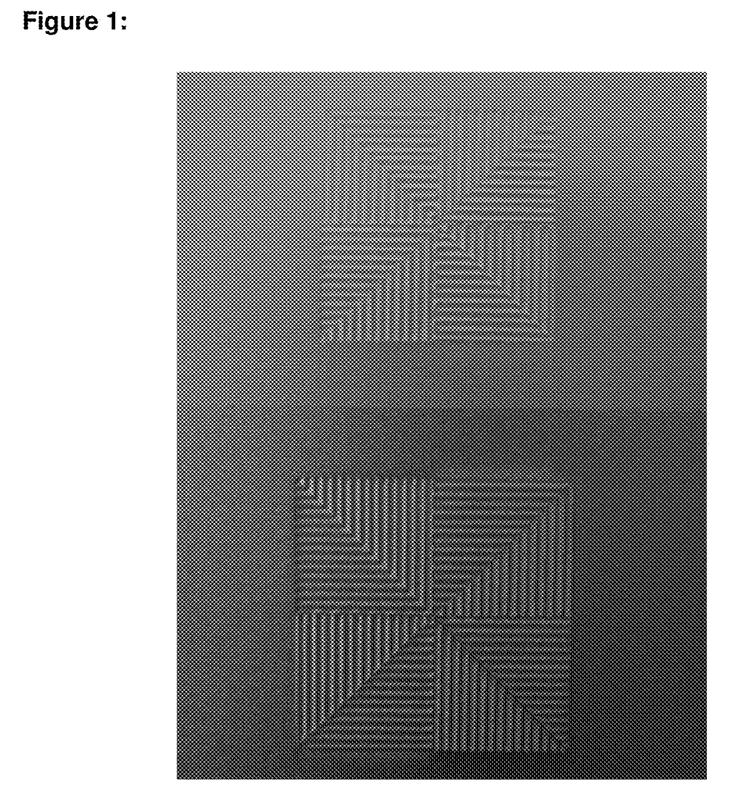
FIG. 1: exhibits a magnetically induced pattern, prepared by contacting a black and white lacquer card coated with a lacquer containing pigments according to example 1 with a permanent magnetic sheet exhibiting such a pattern
Figure 2:
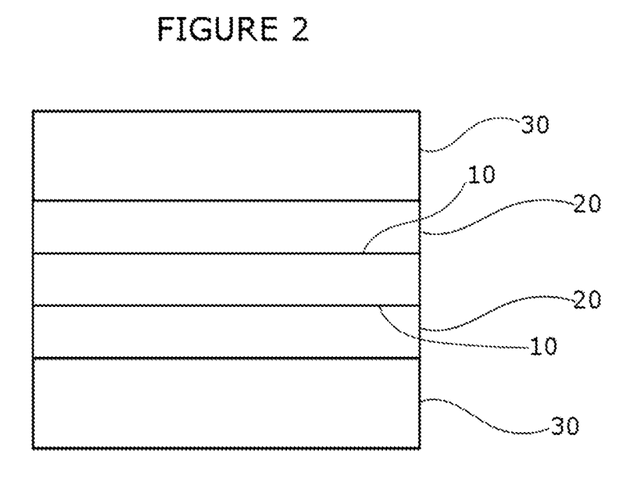
FIG. 2 depicts depict the sequence of the claimed layers (20—first layer, 30—second layer) and their relative locations on the major surfaces (10) of the pigment substrate.
Figure 3:
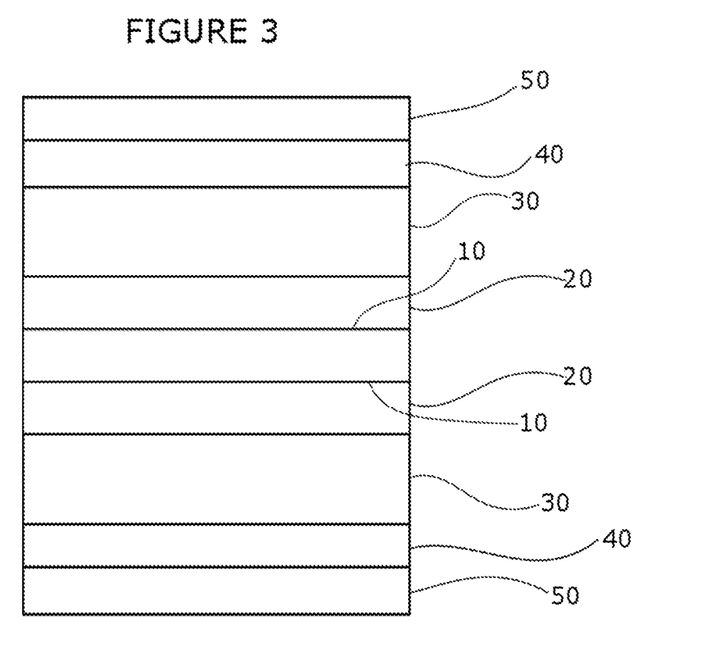
FIG. 3 depicts the sequence of the claimed layers (20—first layer, 30—second layer, 40—silicon oxide hydrate, 50—high refractive index layer) and their relative locations on the major surfaces (10) of the pigment substrate.

Furthermore, a further black and white lacquer card is prepared as mentioned before. While the coating is still wet, a permanent magnetic sheet carrying a pattern is brought into contact with the reverse side of the lacquer card, facing away from the wet coating layer. The magnetic pigments contained in the coating lacquer orient themselves according to the magnetic lines of the magnetic field generated by the permanent magnetic sheet. The resulting magnetically induced pattern, achieved after drying of the pigment containing coating layer, is shown in FIG. 1.

EXAMPLE 2

The procedure of example 1 is repeated except that the amounts for the different coating layers are altered as follows:

TABLE 1

| Sample | substrate g | $Fe_2O_3$ g | $Fe_3O_4$ g | $SiO_2$ g | $SnO_2$ g | $TiO_2$ g |
|---|---|---|---|---|---|---|
| Ex. 1 | 200 | 2 | 70 | 50 | 4 | 80 |
| Ex 2 | 200 | 2 | 90 | 50 | 4 | 100 |

The colouristic values measured by the Minolta 300 apparatus are as follows:

TABLE 2

| | powder colour | | | | | lacquer card | | | | |
|---|---|---|---|---|---|---|---|---|---|---|
| Sample | L | a | b | C | H | L | a | b | C | H |
| Ex. 1 | 69.4 | −1.9 | −8.7 | 8.9 | 257.6 | 48.5 | −2.3 | −9.2 | 9.5 | 256.0 |
| Ex 2 | 70.7 | −2.1 | −10.2 | 10.4 | 258.7 | 47.9 | −2.4 | −10.1 | 10.4 | 257.0 |

The magnetic properties are determined as follows:

TABLE 3

| | Magnetism | | | |
|---|---|---|---|---|
| Sample | $M_s$ emu/g | $M_r$ emu/g | $H_c$ Oe | SR $M_r/M_s$ |
| Ex. 1 | 14.27 | 9.03 | 444 | 0.633 |
| Ex 2 | 16.92 | 10.00 | 312 | 0.591 |

$M_s$: Saturation magnetization
$M_r$: Residual magnetization
$H_c$: Coercive force
SR: $M_r/M_s$

EXAMPLES 3 TO 8

Example 1 is repeated except that the amounts of the starting compounds are altered as demonstrated in table 4.

TABLE 4

| Sample | substrate g | $Fe_2O_3$ g | $Fe_3O_4$ g | $SiO_2$ g | $SnO_2$ g | $TiO_2$ g |
|---|---|---|---|---|---|---|
| Ex. 3 | 100 | 1 | 35 | 25 | 2 | 80 |
| Ex. 4 | 100 | 1 | 35 | 25 | 2 | 100 |
| Ex. 5 | 100 | 1 | 35 | 25 | 2 | 110 |
| Ex. 6 | 100 | 1 | 35 | 25 | 2 | 130 |
| Ex. 7 | 200 | 1 | 90 | 100 | 2 | 160 |
| Ex. 8 | 200 | 1 | 90 | 100 | 2 | 200 |

The powder colours and the interference colours on the corresponding lacquer cards of the pigments according to examples 3 to 8 are as follows:

Example 3: powder: brilliant copper — lacquer card: copper/bronze flop
Example 4: powder: brilliant purple — lacquer card: bluish violet/magenta flop
Example 5: powder: brilliant blue — lacquer card: steel blue/dark cobalt blue flop
Example 6: powder: brilliant green — lacquer card: yellowish green/dark bluish green flop
Example 7: powder: brilliant red-violet — lacquer card: copper/red violet flop
Example 8: powder: brilliant turquoise — lacquer card: bluish green/turquoise flop The pigments exhibit an excellent hiding power.
The colouristic properties measured by Minolta 300 are as follows:

TABLE 5

| | powder colour | | | | | lacquer card | | | | |
|---|---|---|---|---|---|---|---|---|---|---|
| Sample | L | a | b | C | H | L | a | b | C | H |
| Ex. 3 | 54.57 | 7.59 | 13.4 | 15.4 | 60.6 | 35.83 | −1.11 | −6.27 | 6.36 | 260 |
| Ex. 4 | 46.48 | 19.24 | −26.75 | 32.95 | 305.6 | 31.04 | 8.63 | −23.31 | 24.85 | 290.2 |
| Ex. 5 | 51.36 | 0.44 | −24.19 | 24.19 | 271 | 33.61 | −2.34 | −19.36 | 19.51 | 262.9 |
| Ex. 6 | 63.98 | −16.4 | 3.97 | 16.87 | 166.5 | 38.29 | −8.99 | −0.24 | 8.99 | 181.5 |
| Ex. 7 | 56.65 | 18.51 | −0.95 | 18.53 | 356.1 | 48.24 | 8.42 | 2.61 | 8.81 | 17.2 |
| Ex. 8 | 55.04 | −8.82 | −17.78 | 19.84 | 243.7 | 48.9 | −12.04 | −4.96 | 13.02 | 202.3 |

COMPARATIVE EXAMPLES 1 TO 3

Example 1 is repeated except that the substrate particles are changed to be mica flakes having a particle size of from 10-60 μm and that the amounts for each coating layer are altered as set out in table 6:

TABLE 6

| Sample | substrate g | $Fe_2O_3$ g | $Fe_3O_4$ g | $SiO_2$ g | $SnO_2$ g | $TiO_2$ g |
|---|---|---|---|---|---|---|
| Comp. Ex. 1 | 200 | 2 | 70 | 50 | 4 | 40 |
| Comp. Ex. 2 | 200 | 2 | 70 | 50 | 4 | 50 |
| Comp. Ex. 3 | 200 | 2 | 70 | 50 | 4 | 80 |

The colouristic properties of these samples are measured as follows:

TABLE 7

| Sample | powder colour | | | | | lacquer card | | | | |
|---|---|---|---|---|---|---|---|---|---|---|
| | L | a | b | C | H | L | a | b | C | H |
| Comp. Ex. 1 | 47.8 | 2.7 | 1.0 | 2.9 | 20.8 | 33.5 | −0.9 | −3.4 | 3.4 | 255.6 |
| Comp. Ex. 2 | 47.6 | 1.4 | −1.9 | 2.3 | 305.8 | 34.4 | −1.6 | −4.8 | 5.0 | 251.4 |
| Comp. Ex. 3 | 54.5 | −1.0 | −2.7 | 2.9 | 249.7 | 35.0 | −2.7 | −4.3 | 5.1 | 238.0 |

The powder and interference colour of the resulting pigments is silvery, but they exhibit a very low luster and do not possess attractive colouristic properties.

The invention claimed is:

1. A magnetic pigment, comprising
a transparent flaky homogeneous substrate having two parallel major surfaces wherein said substrate is a synthetically produced material of $Al_2O_3$, of $Al_2O_3$ containing up to 5% by weight $TiO_2$, of $SiO_2$, of $SiO_2$ containing up to 20% by weight silicon hydroxide, of glass or of a borosilicate
and
a coating comprising a layered structure, said layered structure consisting of a first layer comprising hematite and/or goethite having a thickness, and of a second layer comprising magnetite, the second layer having a thickness and being located on the first layer, in this sequence, at least on the two major surfaces of the substrate, wherein the thickness of the second layer of magnetite is larger than the thickness of the first layer of hematite and/or goethite
and
wherein the magnetic pigments further comprise one or more dielectric layers on top of the magnetite layer wherein said dielectric layer comprises a silicon oxide hydrate layer being located directly on the magnetite layer and a high refractive index layer on the silicon oxide hydrate layer.

2. A magnetic pigment according to claim 1, wherein the substrate has a mean thickness between 100 and 1000 nm.

3. A magnetic pigment according to claim 1, wherein the layer composed of hematite and/or goethite is located directly onto the substrate.

4. A magnetic pigment according to claim 1, wherein there is at least one dielectric coating located between the substrate and the layer composed of hematite and/or goethite.

5. A magnetic pigment according to claim 1, wherein the magnetite layer is doped with an aluminum compound.

6. A magnetic pigment according to claim 5, wherein the aluminum compound is an oxide and/or an oxide hydrate.

7. A magnetic pigment according to claim 5, wherein the content of the aluminum compound is between 0.1 and less than 5% by weight, based on the weight of the magnetite layer.

* * * * *